T. J. PRICE.

Revolving Harrow.

No. 57,185.

Patented Aug. 14, 1866.

Witnesses:

Inventor:

UNITED STATES PATENT OFFICE.

THOMAS J. PRICE, OF AUBURN, KENTUCKY.

IMPROVEMENT IN COMBINED SEEDER AND CULTIVATOR.

Specification forming part of Letters Patent No. 57,185, dated August 14, 1866.

*To all whom it may concern:*

Be it known that I, THOMAS J. PRICE, of Auburn, in the county of Logan and State of Kentucky, have invented certain new and useful Improvements in Combined Cultivator and Seed-Coverer; and I hereby declare the following to be a full, clear, and exact description of the same, reference being had to the accompanying drawings, in which—

Figure 1:
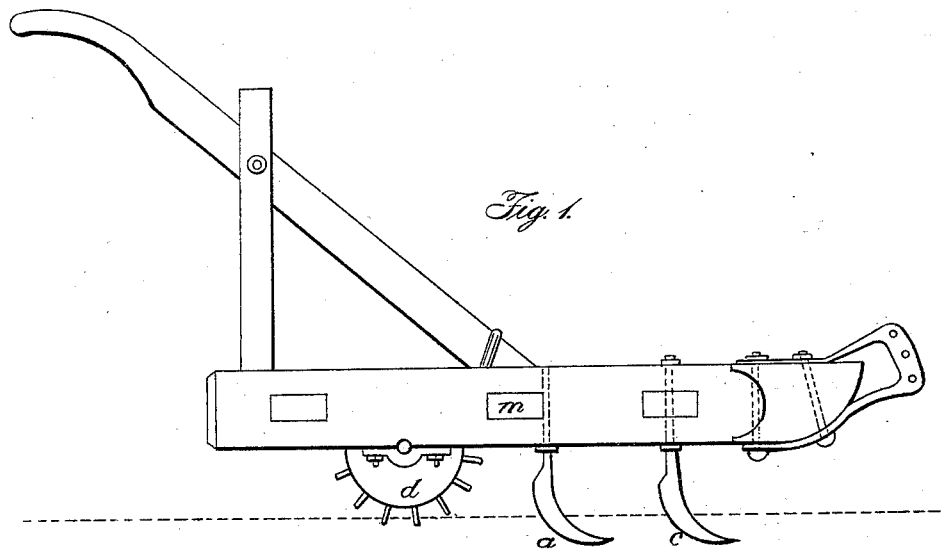
Figure 2:
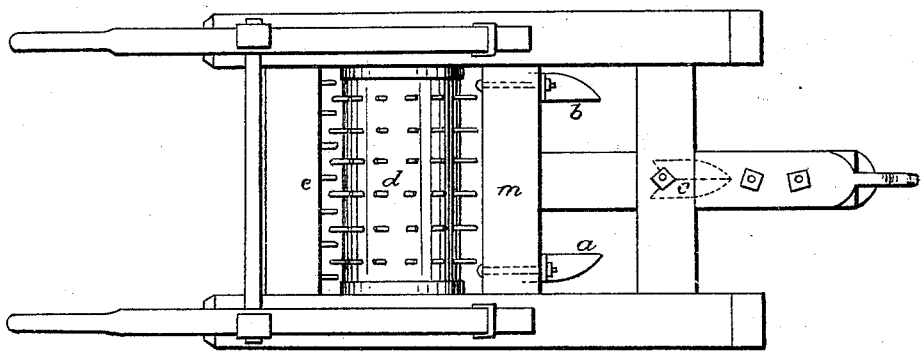

Figure 1 represents in elevation, and Fig. 2 in plan, a machine constructed in accordance with my invention.

The nature of my invention consists in combining in one machine the functions of a cultivator and those of a seed-coverer, the machine being so arranged for operation that it can be used for either purpose, as the occasion may demand.

A further feature of my invention is the employment, in connection with a machine thus constructed, of a spiked roller or pulverizer, which will thoroughly break up the earth or mold turned up by the machine, whether used as a cultivator or corn-coverer.

In order to carry out my invention, I make the plow-teeth adjustable, so that they may be changed from one side to the other of the machine at pleasure. In a machine with three teeth, for instance, if it is to be used as a cultivator, the tooth in front, which may be either a colter or a shovel tooth, may be allowed to remain, and the two teeth in rear, one on each side of the machine, are so arranged that the share and mold-board shall turn the dirt outward.

Now, if it be desired to use the machine for a corn-coverer, the front tooth is removed and the two teeth in rear exchange positions, the tooth on the right being moved to the left and the tooth on the left to the right. By this disposition it will be seen that the shares and mold-board of the teeth are turned so that, instead of the dirt throwing outward, they throw it inward and toward each other. The seed in the furrow or drill between the two teeth is thus covered by the earth, and the spiked roller, which follows immediately in rear, crushes and pulverizes the mold, making the covering complete.

In order that the nature of my invention may be more fully understood, I will describe the manner in which it may be carried into effect by reference to the accompanying drawings. The machine there represented consists of two parts, the cultivator or coverer being in front and the roller or pulverizer behind.

The front tooth, *c*, which is secured in the center beam, may be of any shape to suit the nature of the work. It may be either a colter or a shovel tooth, curved or straight, as may be deemed best. This tooth is adjustable, and can be removed from the plow or allowed to remain, according to the work to be performed.

The two teeth *a* and *b* are shaped similarly to an ordinary plowshare, the mold-board of the one being on the right side and the other on the left side, so that they will throw the earth to or from each other, according to their respective positions in the frame. They are held in place in rear and on each side of the front tooth, *c*, and are secured to the cross-piece *m* of the frame of the machine in any suitable manner, so that they may be easily adjusted to or removed from the same.

As shown in the drawings, the machine is arranged for use as a cultivator. The central shovel-tooth, *c*, throws up the earth on each side, while the two teeth *a b* in rear throw the earth outward, *a* throwing it to the right and *b* to the left, this, of course, being occasioned by the mold-boards of the plow-teeth being turned outward.

The spiked roller *d*, which has its bearings in the frame and follows the teeth, crushes and pulverizes the plowed ground and completes the work of the cultivator. The spikes and cleaners *e*, which are fixed in the rear of the frame, prevent the roller from clogging.

If it be desired to put the machine to use as a seed-coverer, the tooth *c* is removed and the teeth *a* and *b* change positions, *a* occupying the place now held by *b*, and vice versa. It will be seen that on account of this change of position the earth turned up by the shares will no longer be thrown outward, but inward, the mold-boards of the teeth *a* and *b* throwing the earth toward the center of the frame. By this means, when the machine is so placed that the drill or furrow in which the seed has been dropped comes between the two teeth, the seed are effectually covered by the earth thrown up, and the roller, following behind, by pressing down and pulverizing the earth thrown over the seed, completes the work.

Having thus described my invention and the manner in which the same is or may be carried into effect, what I claim, and desire to secure by Letters Patent, is—

1. The combined cultivator and seed-coverer, constructed and arranged substantially as herein shown and described—that is to say, having adjustable interchangeable teeth capable of being shifted and secured in different parts of the frame, as and for the purposes set forth.

2. In combination with the cultivator with adjustable and interchangeable teeth, as described, the spiked roller, when constructed and arranged for operation as and for the purposes herein set forth.

3. The combination, in a cultivator or seed-coverer constructed and arranged as herein described, of the roller with a stationary spiked cross-bar to clean the roller and prevent its becoming clogged, substantially as herein set forth.

In testimony whereof I have signed my name to this specification before two subscribing witnesses this 26th day of May, 1866.

THOS. J. PRICE.

Witnesses:
M. B. MORTON, Jr.,
WM. G. WILSON.